United States Patent
Kagleder

(10) Patent No.: US 7,400,965 B2
(45) Date of Patent: Jul. 15, 2008

(54) IGNITION CONTROL PROCESS

(75) Inventor: Erich Kagleder, Piding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/896,308

(22) Filed: Aug. 30, 2007

(65) Prior Publication Data

US 2008/0046163 A1    Feb. 21, 2008

Related U.S. Application Data

(63) Continuation of application No. PCT/EP2006/001378, filed on Feb. 16, 2006.

(30) Foreign Application Priority Data

Mar. 4, 2005    (DE) ........................ 10 2005 009 956

(51) Int. Cl.
    *F02P 5/15*    (2006.01)
(52) U.S. Cl. ...................... 701/102; 123/609; 123/637; 324/399

(58) Field of Classification Search ................. 123/609, 123/637, 644; 324/380, 399; 701/102, 114
See application file for complete search history.

(56) References Cited

U.S. PATENT DOCUMENTS

| | | | |
|---|---|---|---|
| 6,006,143 A | 12/1999 | Bartel et al. | |
| 6,085,144 A | 7/2000 | Tozzi | |
| 6,360,587 B1 | 3/2002 | Noel | |
| 2008/0006242 A1* | 1/2008 | Kagleder | ............... 123/406.28 |

FOREIGN PATENT DOCUMENTS

| | | |
|---|---|---|
| DE | 101 38 976 A1 | 3/2002 |
| DE | 103 35 905 A1 | 2/2005 |
| EP | 0 922 856 B1 | 6/1999 |

* cited by examiner

*Primary Examiner*—T. M Argenbright
(74) *Attorney, Agent, or Firm*—Crowell & Moring LLP

(57) ABSTRACT

A process is provided for ignition control in a cylinder of an internal combustion engine, using an ignition coil which has a connected primary winding and a secondary winding which is connected to a spark plug, and an ignition control unit which is used to control circuit logic connecting the primary winding by means of a line. According to the process, at the beginning of a working cycle, a switching signal is transmitted from the ignition control unit to the circuit logic, marking the beginning of the working cycle, and the temporal length of the signal is used as a reference length (idle time) for other digital information transmitted to the circuit logic by the ignition control unit.

16 Claims, 2 Drawing Sheets

IGNITION CONTROL PROCESS

CROSS-REFERENCE TO RELATED APPLICATIONS

This application is a continuation of PCT International Application No. PCT/EP2006/001378, filed on Feb. 16, 2006, which claims priority under 35 U.S.C. §119 to German Application No. 10 2005 009 956.4, filed Mar. 4, 2005, the entire disclosures of which are expressly incorporated by reference herein.

BACKGROUND AND SUMMARY OF THE INVENTION

The present invention relates to an ignition control process in a cylinder of an internal-combustion engine, having an ignition coil whose primary winding is switched and a secondary winding thereof being connected with a spark plug, as well as an ignition control unit which, by way of a line, controls a switching logic switching the primary winding.

A process for the ignition control of the above mentioned type is known from German Patent document DE 101 38 976 A. As a rule, this process is used in the case of an internal-combustion engine having a single-coil ignition system, in which a correspondingly switched ignition coil, and a spark plug connected therewith, are assigned to each cylinder. Several of these single-coil ignition systems are switched by an ignition control unit. As a rule, the switching logic assigned to each single-coil ignition system is also arranged in the single-coil ignition system. Its switching action, for example, for the start and the termination of the charging of the primary winding, is determined by the ignition control unit.

The ignition control unit itself is arranged at a spatial distance from the cylinders and is connected with the switching logics by way of individual electric lines. These lines are problematic with respect to electromagnetic compatibility because electric irradiation and, thereby, interferences with the signal transmission may occur which are caused by the high electrical fields.

It is an object of the present invention to provide an ignition control process of the above-mentioned type by which the signal transmission between the ignition control unit and the switching logics is implemented largely free of interferences.

This object is achieved by a process for the ignition control in a cylinder of an internal-combustion engine, having an ignition coil whose primary winding is switched and a secondary winding thereof being connected with a spark plug, as well as an ignition control unit which, by way of a line, controls a switching circuit logic switching the primary winding. At the start of a power cycle, a switching signal is transferred from the ignition control unit to the switching logic, which switching signal marks the start of the power cycle, and whose length of time is used as the reference length (idle time) for additional digital control information transferred from the ignition control unit to the switching circuit logic.

According to the invention, a further development is provided for the signal transmission between the ignition control unit and the switching logics, which switching signal marks the start of the power cycle, and whose length of time is used as the reference length (idle time) for additional digital control information transferred from the ignition control unit to the switching logic. As a result, fusing the length of time of this switching signal as the reference length, high-expenditure time bases in the switching logics can be eliminated. Synchronization measures required in the case of several time bases also become superfluous for these time bases. A process is therefore obtained which is largely protected from interfering influences and is connected with low expenditures.

Advantageous further developments of the invention are described and claimed herein.

Other objects, advantages and novel features of the present invention will become apparent from the following detailed description of the invention when considered in conjunction with the accompanying drawings.

DETAILED DESCRIPTION OF THE DRAWINGS

Figure 1:
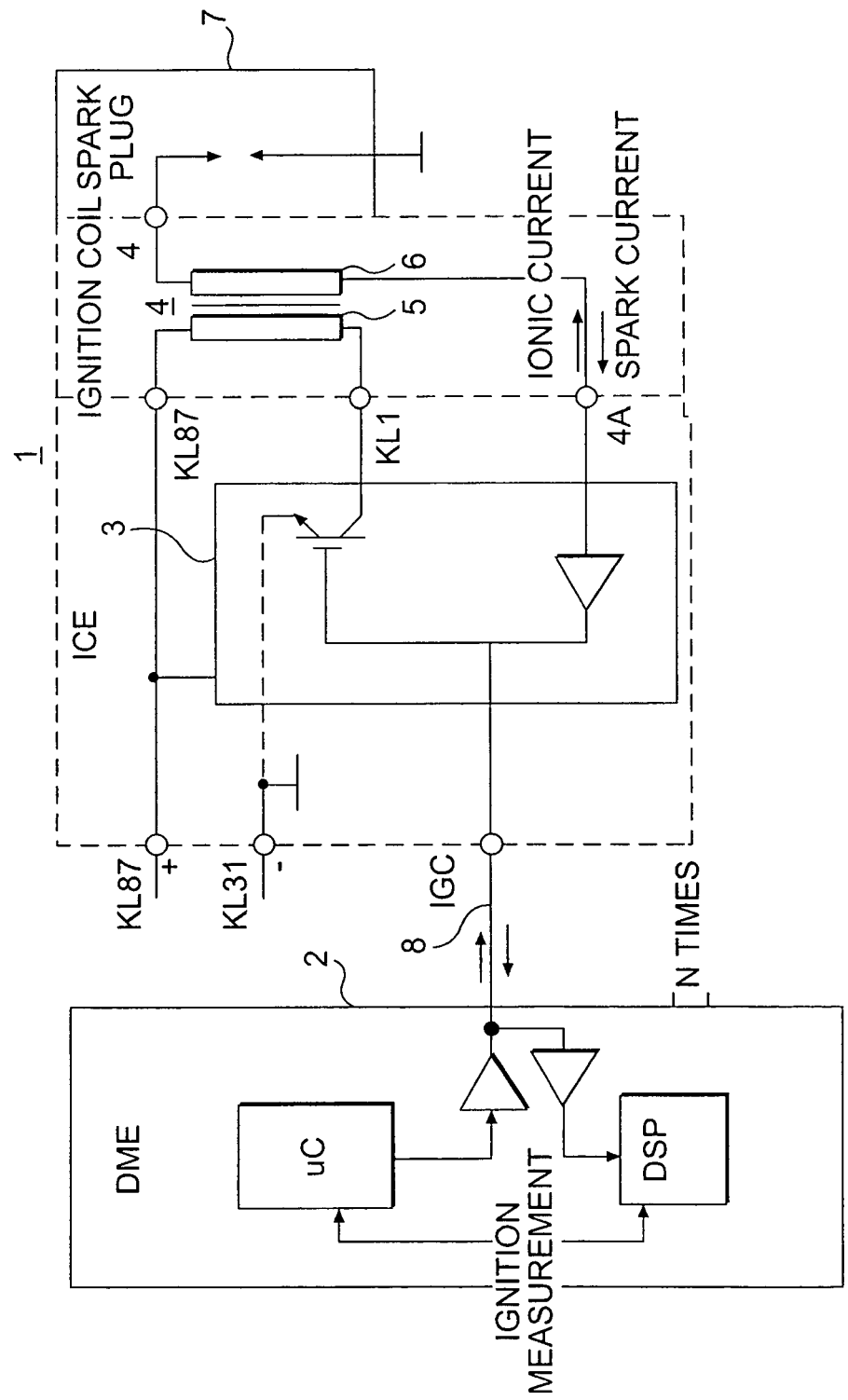
FIG. 1 is a schematic block diagram of an ignition control system for an internal-combustion engine according to the invention.

The ignition control system shown in FIG. 1 illustrates a single-coil ignition system 1 for a cylinder of an internal-combustion engine (not shown), which single-coil ignition system 1 is controlled by an ignition control unit 2. The ignition control unit 2 is contained in a digital engine electronic unit 2 (called a DME), which also controls the fuel injection into the different (n) cylinders and, in addition to the one cylinder, the ignition of the other cylinders.

The individual-coil ignition system 1 consists essentially of a switching logic 3, an ignition coil 4 having a primary winding 5 and secondary winding 6, and of a spark plug 7.

The DME is connected with the single-coil ignition system by way of three lines. These include two lines (KL87 and KL31) to the two poles (±) of the onboard power supply, as well as a control line 8 (called IGC).

The control line 8 is used as a current interface between the single-coil ignition system 1 and the ignition control unit 2, which operates in both directions (bidirectionally). The operating direction of control line 8 can be adjusted by different voltage levels of 0 and 8V applied to the control line.

At the voltage level 8V, the control line 8 transmits an ionic current signal originating from the secondary winding 6 as an analog signal. This signal permits the supplying of information concerning the type and extent of the combustion taking place in the cylinder. Caused by the rotational-speed-dependent and load-dependent large extent of the ionic current signal, the ionic current signal is intensified in the switching logic 3 and is subsequently transmitted on control line 8. The intensification factor provided for this purpose is transmitted as a digital signal, also originating from the ignition control unit 2, by way of control line 8, to the switching logic. A voltage level of 0V is set for this purpose. At this voltage level, the ignition control unit 2 also transits a digital control signal to the switching logic 3 and thereby triggers the ignition.

Figure 2A:
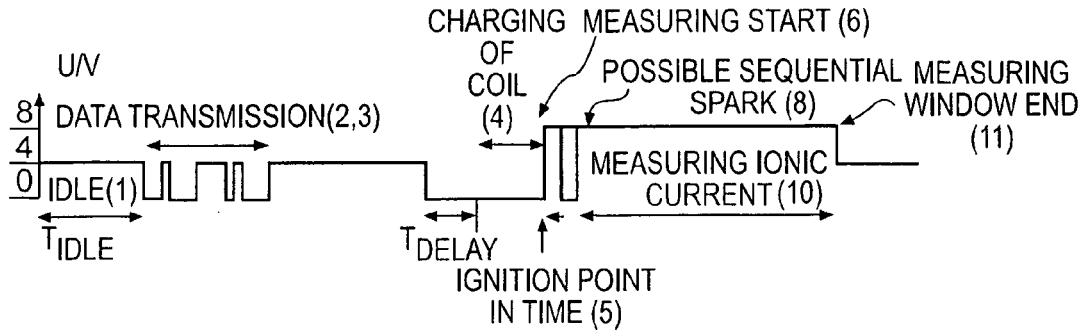
FIGS. 2a-2c are views of several time sequence diagrams for explaining the method of operation of the ignition control system of FIG. 1.
Figure 2B:
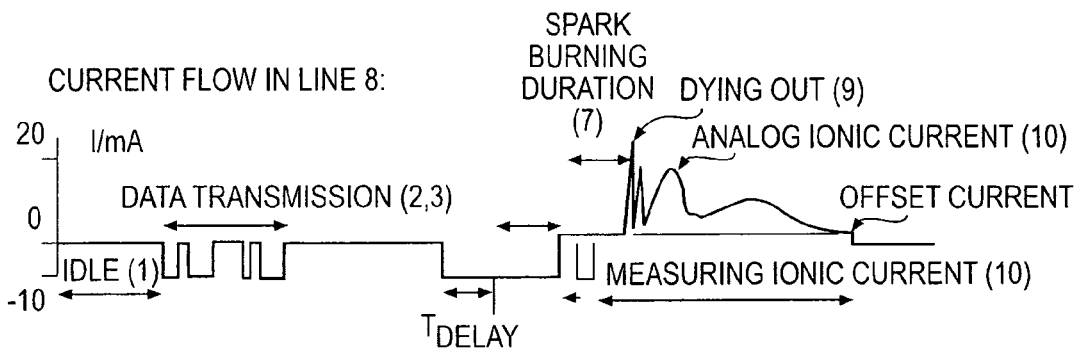
Figure 2C:
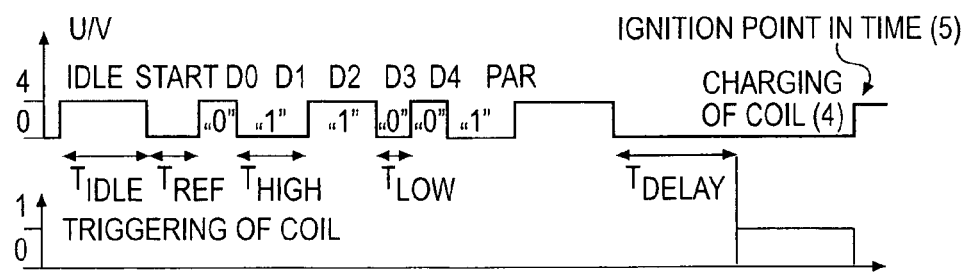

The time sequence is explained in FIGS. 2a-2c by way of a voltage curve diagram marked as FIG. 2a, a current flow diagram marked as FIG. 2b as well as a data transmission diagram marked as FIG. 2c.

Starting from an inoperative condition, during which no signal (4V or 0 mA) is present on control signal, line 8 for a sufficiently long idle time $T_{idle}$, the ignition control unit 2, by way of the signal line, activates a start bit called START for the power cycle for a defined time $T_{ref}$ of 150 µs. This time is used as a time reference for the switching logic 3. The start bit START is followed by the actual information bits D0-D3. In this case, the differentiation according to $T_{low}$="0" or $T_{high}$="1" is the time duration with respect to the start bit duration $T_{ref}$. Shorter than $T_{ref}$, here, 0.5 times $T_{ref}$, means bit=0; longer than $T_{ref}$, here, 1.5 times $T_{ref}$ means bit=1.

D0, here having the value=1, corresponds to one of two adjustable values for the measuring voltage to be set.

D1-D3 result in one of eight conceivable binary values for the intensification of the ionic current signal to be adjusted, which signal originates from the secondary winding 6.

With D4 (value=0 or 1), here, at the value=1, an offset current for the ionic current signal is set, and thus a diagnosis of the ignition system is carried out. If the ionic current signal differs in the case of two mutually successive power cycles when, for one of the two power cycles, an offset current shown here is set, the operating sequence is in order. If no difference exists, this points to an error in the switching logic 3. This is based on the consideration that the same operating condition of the internal-combustion engine exists in the case of two mutually successive power cycles and a difference in the ionic current signal can then only be caused by the offset current.

A parity bit called PAR is used for protecting the data transmission.

The charging of the primary winding 5 then takes place as a function of the desired ignition point-in-time. For this purpose, the signal condition on control line 8 is permanently changed. After the expiration of a switch-on delay $T_{delay}$, which is equal to twice the start bit duration $T_{ref}$, the primary winding 5 is charged. This suppresses an unintentional charging of the primary winding 5 during the data transmission. At the ignition point in time (marked by a lightening signal), the primary winding 5 is switched off; the secondary high voltage occurs; and the ignition takes place.

After the ignition, line 8 is applied to 8V and is thereby switched to ionic current measuring.

After the decaying of the ignition spark current, the residual energy of the ignition coil 4 dies out. This can already be measured in the ionic current signal and can be analyzed for the spark monitoring.

After the dying-out of the residual energy, the adjusted measuring voltage is applied above the spark plug 7 and an ionic current is flowing. The ionic current is intensified corresponding to the adjusted intensity; as required, it is raised with a set offset current and is returned as analog current by way of the line 8 to the ignition control unit 2. By use of the ionic current signal, this ignition control unit 2 detects possible defects in the ignition process and, as required, can take safety measures.

A further improvement of the process according to the invention is only outlined. A second ignition spark can be triggered at special operating points of the internal-combustion engine. For this purpose, it is provided that a new energizing process for the primary winding be carried out when, after the first triggering of the ignition (lightening signal) and, during the assumed spark burning time, a change of the control information on line 8 is carried out as indicated by a dotted line within a time period whose length is selected to be shorter than the idle time $T_{idle}$. The primary winding 5 is energized again and the energizing is interrupted, whereby an ignition spark is immediately generated again in the spark plug 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for ignition control in a cylinder of an internal-combustion engine, using an ignition coil having a primary winding that is switched and a secondary winding which is connected to a spark plug, and an ignition control unit which, by way of a control line, controls a circuit logic switching the primary winding, the process comprising the acts of:
   transferring a switching signal from the ignition control unit to the circuit logic at a start of a power cycle, which switching signal marks the start of the power cycle; and
   using a length of time of the switching signal marking the start of the power cycle as a reference length for other digital control information transferred from the ignition control unit to the circuit logic.

2. The process according to claim 1, wherein the other digital control information is a digital signal comprising several bits, and two digital conditions are defined by a bit length which is selected to be larger or smaller than the reference length.

3. The process according to claim 1, wherein the bit lengths for the two digital conditions are selected to be equal to 0.5 times the reference length or 1.5 times the reference length.

4. The process according to claim 2, wherein in a case of other control information which is longer than a maximal bit length, an energizing operation is triggered for the primary winding.

5. The process according to claim 3, wherein in a case of other control information which is longer than a maximal bit length, an energizing operation is triggered for the primary winding.

6. The process according to claim 4, wherein the energizing operation for the primary winding is terminated, and the primary winding is switched, when a digital condition of the control information is changed.

7. The process according to claim 5, wherein the energizing operation for the primary winding is terminated, and the primary winding is switched, when a digital condition of the control information is changed.

8. The process according to claim 6, wherein the energizing operation is carried out immediately when the control information is changed.

9. The process according to claim 7, wherein the energizing operation is carried out immediately when the control information is changed.

10. The process according to claim 4, wherein a new energizing operation is carried out when, after a change of the control information, a control information is transferred within a time period whose duration is selected to be shorter than the reference length.

11. The process according to claim 6, wherein a new energizing operation is carried out when, after a change of the control information, a control information is transferred within a time period whose duration is selected to be shorter than the reference length.

12. The process according to claim 8, wherein a new energizing operation is carried out when, after a change of the control information, a control information is transferred within a time period whose duration is selected to be shorter than the reference length.

13. The process according to claim 1, wherein an ionic current signal occurring at the spark plug is measured and is transmitted back to the ignition control unit.

14. The process according to claim 13, wherein an offset current for the ionic current signal is set, and a diagnosis of the ignition system is performed by comparing the ionic current signal in the case of two mutually successive power cycles, wherein the offset current is set only in the case of one power cycle.

15. The process according to claim 13, wherein, for controlling the offset current, a digital control information is transmitted from the ignition control unit to the switching logic.

16. The process according to claim 14, wherein, for controlling the offset current, a digital control information is transmitted from the ignition control unit to the switching logic.

* * * * *